United States Patent
Brunel

(10) Patent No.: US 7,230,973 B2
(45) Date of Patent: Jun. 12, 2007

(54) MULTI-USER DETECTION METHOD WITH ACCELERATED SPHERE DECODING

(75) Inventor: Loïc Brunel, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 777 days.

(21) Appl. No.: 10/421,912

(22) Filed: Apr. 24, 2003

(65) Prior Publication Data

US 2004/0013205 A1    Jan. 22, 2004

(30) Foreign Application Priority Data

May 17, 2002    (EP)    .................................. 02291240

(51) Int. Cl.
*H04B 1/69*        (2006.01)
*H04B 1/707*       (2006.01)

(52) U.S. Cl. ........................................ 375/140; 375/130
(58) Field of Classification Search ................. 375/140, 375/130
See application file for complete search history.

(56) References Cited

U.S. PATENT DOCUMENTS

| | | | | |
|---|---|---|---|---|
| 5,343,500 | A * | 8/1994 | Betts et al. ................. | 375/262 |
| 5,487,173 | A * | 1/1996 | Greiss et al. ................. | 721/35 |
| 5,519,879 | A * | 5/1996 | Carmon ........................ | 712/35 |
| 5,613,149 | A * | 3/1997 | Afek et al. .................... | 712/36 |
| 5,995,539 | A * | 11/1999 | Miller ........................... | 375/222 |
| 6,157,621 | A * | 12/2000 | Brown et al. ................. | 370/310 |
| 6,263,017 | B1 * | 7/2001 | Miller .......................... | 375/222 |
| 6,332,030 | B1 * | 12/2001 | Manjunath et al. .......... | 382/100 |
| 6,801,579 | B1 * | 10/2004 | Hassibi et al. ................ | 375/264 |
| 2002/0009132 | A1 * | 1/2002 | Miller .......................... | 375/222 |
| 2003/0012316 | A1 * | 1/2003 | Ahmed et al. ................ | 375/354 |

FOREIGN PATENT DOCUMENTS

| | | |
|---|---|---|
| WO | WO 00/41374 | 7/2000 |
| WO | WO 00/48330 | 8/2000 |

OTHER PUBLICATIONS

Loïc Brunel, "Optimum and Sub-Optimum Multiuser Detection Based on Sphere Decoding for Multi-Carrier Code Division Mulitple Access Systems" 2002 IEEE International Conference on Communications, New York, NY, IEEE, US, vol. 1 of 5, Apr. 28, 2002. pp. 1526-1530.

Loïc Brunel, "Channel Decoding Algorithms for Spread Spectrum Multiple Access" École Nationale Supérieure des Télécommunications, Paris, Dec. 16, 1999, pp. 1-74.

* cited by examiner

*Primary Examiner*—David C. Payne
*Assistant Examiner*—Erin M. File
(74) *Attorney, Agent, or Firm*—Oblon, Spivak, McClelland, Maier & Neustadt, P.C.

(57) ABSTRACT

A method is provided for detecting a plurality of symbols ($d_k(i)$) transmitted by or for a plurality K of users, each symbol belonging to a modulation constellation. Filtering of a received signal is performed for supplying a vector (z) each component of which being related to a user. The closest neighbor of the vector is searched among candidates belonging to a lattice of points generated by the modulation constellations. The search is limited to a volume centered around the vector and is carried out by sequentially selecting a coordinate ($b_k$) of a candidate for each dimension of the vector. The components of the vector are recorded according to an ordering rule prior to the search, the ordering rule being chosen so as to eliminate a higher rate of candidates for a first dimension than for a subsequent dimension to be searched.

8 Claims, 5 Drawing Sheets dim 2K dim 2K-1 dim 2K-2

MULTI-USER DETECTION METHOD WITH ACCELERATED SPHERE DECODING

The present invention concerns a multi-user detection method. More particularly, the present invention concerns a maximum likelihood multi-user detection method for a DS-CDMA (Direct Sequence Code Division Multiple Access) telecommunication system or a MC-CDMA (Multi Carrier Code Division Multiple Access) telecommunication system.

In a DS-CDMA mobile telecommunication system, the separation of the communications coming from or going to the different users is achieved by multiplying each complex symbol of a user by a spreading sequence which is peculiar to him, also referred to for this reason as the user signature. The spreading frequency (chip rate) being greater than the frequency of the symbols, the signal transmitted by each user is distributed (or spread) in the space of the frequencies. The ratio between the band occupied by the spread signal and the band occupied by the information signal is referred to as the spreading factor. On reception, the separation of a given user is obtained by means of a filtering adapted to the corresponding signature. When the transmission channel has a plurality of propagation paths, the output of the adapted filtering contains as many correlation peaks. Each path of the channel can be modeled by a complex multiplicative coefficient and a delay. The signals being propagated along the different paths can be aligned and combined by means of complex coefficients which are conjugates of the path coefficients, thus effecting a filtering adapted to the transmission channel. In order to simplify the terminology, the general expression "filtering matched to the user k" will encompass both the filtering operation matched to the signature of the user k and the filtering operation matched to the transmission channel.

To combat the interference between signals destined for (the downlink) or coming from (the uplink) the different users, multi-user detection methods have been proposed, and notably iterative detection methods such as those known as PIC (Parallel Interference Cancellation) and SIC (Serial Interference Cancellation). They are based on the iteration of an interference elimination cycle including the estimation of the symbols transmitted, the evaluation of the interferences and their subtraction from the signals received. Although of high performance, these methods are not optimal since they do not provide an estimation in the sense of the maximum likelihood of the symbols transmitted by the different users.

More recently a method of multi-user detection using a maximum likelihood criterion and based on a representation by a lattice of points was proposed by L. Brunel et al., in an article entitled "Lattice decoding for joint detection in Direct Sequence CDMA systems" available on the website www.enst.fr/~brunel. According to this method, a vector characteristic of the received signal representing a statistic sufficient for the maximum likelihood detection of the symbols transmitted by the different users is determined. It can be shown under certain conditions that the characteristic vector can be represented as a point in a lattice disturbed by noise. The detection then consists of seeking the point in the lattice closest to the point corresponding to the vector received.

More specifically, let us first consider a DS-CDMA telecommunication system with a base station communicating with K users and let $d_k(i)$ be the complex symbol sent to the user k at instant i on the downlink channel. This symbol belongs to a constellation modulation, denoted $A_k$, relative to the user k and hereinafter referred to as the modulation alphabet of user k.

The base station transmits to each user k a block of N symbols with an amplitude of the signal $a_k$. The symbols for a user k are spread by a real signature $s_k(t)$ with a duration equal to the symbol period T, that is: $s_k(t)=0$ if $t \notin [0,T[$. The K complex symbols transmitted at instant i are placed in a row vector d(i) defined as $d(i)=(d_1(i),d_2(i), \ldots ,d_K(i))$.

The corresponding modulated signal is then, as a function of the time t:

$$S_t = \sum_{i=0}^{N-1} \sum_{k=1}^{K} a_k d_k(i) s_k(t - iT) \qquad (1)$$

We assume that the downlink channel is an ideal channel with white additive Gaussian noise (AWGN). If we denote $r_t = S_t + \eta_t$ the signal received at time t by a user k where $\eta_t$ is a real vector having Gaussian components of zero mean and variance $N_0$. A sufficient statistic for the maximum likelihood detection of d(i) is constituted of the observation vector $y(i)=(y_1(i),y_2(i), \ldots ,y_K(i))$ where $y_k(i)$ is matched filter output associated with user k, i.e.

$$y_k(i) \stackrel{\Delta}{=} \int_{-\infty}^{+\infty} s_k(t - iT) r_t \, dt \qquad (2)$$

$$= \sum_{q=1}^{K} a_q d_q(i) \int_0^T s_q(t) s_k(t) \, dt + n_k(i)$$

$$= \sum_{q=1}^{K} a_q d_q(i) R_{qk} + n_k(i)$$

with $R_{qk} = \int_0^T s_q(t) s_k(t) \, dt$ for $k, q = 1, \ldots, K$ and $n_k(i) = \int_0^T \eta_t \cdot s_k(t - i.T) \, dt$ The expression (2) may be rewritten, by adopting a matrix formulation:

$$y(i) = d(i)M + n(i) \qquad (3)$$

where M=AR, $A=\text{diag}(a_1, \ldots, a_K)$ is the K×K diagonal matrix containing the amplitude coefficients of the K active users and $R=[R_{qk}]$ is the K×K signature cross-correlation matrix.

The vector y(i) in equation (3) can be seen as a point of a lattice of dimension K with a generator matrix M corrupted by a noise n. The term lattice of points Λ of dimension K will be used for any set of vectors of $R^K$ satisfying:

$$x = b_1 v_1 + b_2 v_2 + \ldots + b_K v_K \qquad (4)$$

and where $\{v_1, v_2, \ldots, v_K\}$ is a base on $R^K$.

These base vectors form the rows of the generator matrix G of the lattice. It is therefore possible to write:

$$x = bG \text{ where } b = (b_1, \ldots, b_K) \in Z^K. \qquad (5)$$

Such a lattice has been represented in FIG. 1 in the case K=2.

In practice, the components of the noise vector n(i) being correlated, an operation of noise whitening is performed on the signal y(i) prior to decoding. The autocorrelation matrix R being symmetrical defined positive, it can be decomposed by a Cholesky factorization into:

$$R = WW^T \quad (6)$$

where W is an inferior triangular matrix of size K×K. A whitened observation vector is defined as $\tilde{y}(i) = y(i)(W^T)^{-1}$ and a new lattice $\Omega$ is defined representing the vectors $\tilde{x}$ with $\tilde{x}(i) = x(i)(W^T)^{-1}$ where $x(i)$ belongs to $\Lambda$.

The expression (3) can therefore be rewritten:

$$\tilde{y}(i) = d(i)\tilde{M} + \tilde{n}(i) \quad (7)$$

where $\tilde{M} = M(W^T)^{-1}$ and $\tilde{n}(i) = n(i)(W^T)^{-1}$. It can easily be shown that, after whitening, the covariance matrix of the filtered noise $\tilde{n}(i)$ is equal to $N_0 I_K$ where $I_K$ is the identity matrix of dimension K. The noise vector $\tilde{n}(i)$ having real Gaussian distributed independent components, maximum likelihood detection amounts to finding out the vector x belonging to the lattice $\Omega$ which is closest to the received vector $\tilde{y}$, in other terms the vector x which minimizes the metric:

$$m(\tilde{y}/x) = \|\tilde{y} - x\|^2 = (\tilde{y} - x)(\tilde{y} - x)^T \text{ for } x \in \Omega \quad (8)$$

It should be noted that the vector $y(i)$ does not need to be whitened if use is made of a metric based on the covariance matrix:

$$m(y/x) = (y - x)R^{-1}(y - x)^T \quad (9)$$

Hereinafter, for reasons of simplification, the observation vector, whitened ($\tilde{y}(i)$) or not ($y(i)$) will be termed z and the metric acting in equation (8) or (9) will be termed $\|.\|$.

The set of transmitted symbols $d_k(i)$ is limited to an alphabet of finite size $A_K \subset Z^K$ hereinafter referred to as a constellation. This constellation is determined by the modulation constellations relative to the K users respectively and the cardinal of the alphabet $A_K$ is equal to the product of the cardinals of the different modulation alphabets. The constellation corresponds to a subset of the lattice $\Lambda$ and hence of the lattice $\Omega$.

An exhaustive maximum likelihood decoding would require a search for the closest neighbour throughout the constellation. The sphere decoding method restricts its calculation to the points which are situated within an area of the constellation situated around the received point, preferably inside a sphere S of given radius $\sqrt{C}$ centered on the received point as depicted in FIG. 1. Only the points in the lattice situated at a quadratic distance less than C from the received point are therefore considered for the minimization of the metric (8) or (9).

In practice, the decoder effects the following minimization:

$$\min_{x \in \Omega} \|z - x\| = \min_{w \in z - \Omega} \|w\| \quad (10)$$

To do this, the smallest vector w in the translated set $z - \Omega$ is sought. The vectors z and w can be expressed as:

$$z = \rho G \text{ with } \rho = (\rho_1, \ldots, \rho_K) \quad (11)$$
$$w = \xi G \text{ with } \xi = (\xi_1, \ldots, \xi_K)$$

It is important to note that $\rho$ and $\xi$ are real vectors. As $w = z - x$, where x belongs to the lattice $\Omega$, this gives the equation $\xi_i = \rho_i - b_i$ for $i = 1, \ldots, K$ with $$w = \sum_{i=1}^{K} \xi_i v_i.$$

The vector w is a point in the lattice whose coordinates $\xi_i$ are expressed in the translated reference frame centered on the received point z. The vector w belongs to a sphere of quadratic radius C centered at 0 if and only if:

$$\|w\|^2 = Q(\xi) = \xi G G^T \xi^T \leq C \quad (12)$$

In the new system of coordinates defined by $\xi$, the sphere of quadratic radius C centered at z is therefore transformed into an ellipsoid centered on the origin. The Cholesky factorization of the Gram matrix $\Gamma = GG^T$ gives $\Gamma = \Delta \Delta^T$, where $\Delta$ is an inferior triangular matrix of elements $\delta_{ij}$.

It should be noted that, if the vector y has been whitened, it is not necessary to effect this factorization since the generator matrix for the lattice is already triangular and inferior. In both cases:

$$Q(\xi) = \xi \Delta \Delta^T \xi^T = \|\Delta^T \xi^T\|^2 = \sum_{i=1}^{K}\left(\delta_{ii}\xi_i + \sum_{j=i+1}^{K}\delta_{ji}\xi_j\right)^2 \leq C \quad (13)$$

By putting $q_{ii} = \delta_{ii}^2$ for $i = 1, \ldots, K$  (14)

$$q_{ij} = \frac{\delta_{ij}}{\delta_{jj}} \text{ for } j = 1, \ldots, K; i = j+1, \ldots, K$$

there is obtained $Q(\xi) = \sum_{i=1}^{K} q_{ii}\left(\xi_i + \sum_{j=i+1}^{K} q_{ji}\xi_j\right)^2$  (15)

Being concerned first of all with the range of possible variations of $\xi_K$, and then adding the components one by one by decreasing index order, the following K inequalities are obtained, which define all the points within the ellipsoid:

$$q_{KK}\xi_K^2 \leq C \quad (16)$$

$$q_{K-1,K-1}(\xi_{K-1} + q_{K,K-1}\xi_K)^2 + q_{KK}\xi_K^2 \leq C$$

$$\forall l \in \{1, \ldots, K\}, \sum_{i=l}^{K} q_{ii}\left(\xi_i + \sum_{j=i+1}^{K} q_{ji}\xi_j\right)^2 \leq C$$

It can be shown that the inequalities (16) make it necessary and sufficient for the integer components of b to satisfy:

$$\left\lceil -\sqrt{\frac{C}{q_{KK}}} + \rho_K \right\rceil \leq b_K \leq \left\lfloor \sqrt{\frac{C}{q_{KK}}} + \rho_K \right\rfloor \quad (17)$$

$$\left\lceil -\sqrt{\frac{C - q_{KK}\xi_K^2}{q_{K-1,K-1}}} + \rho_{K-1} + q_{K,K-1}\xi_K \right\rceil \leq b_{K-1} \leq \left\lfloor - \right.$$

$$\left. \sqrt{\frac{C - q_{KK}\xi_K^2}{q_{K-1,K-1}}} + \rho_{K-1} + q_{K,K-1}\xi_K \right\rfloor$$

-continued $$\left\lceil -\sqrt{\frac{1}{q_{ii}}\left(C - \sum_{l=i+1}^{K} q_{ll}\left(\xi_l + \sum_{j=l+1}^{K} q_{jl}\xi_j\right)^2\right)} + \rho_i + \sum_{j=i+1}^{K} q_{ji}\xi_j \right\rceil \le b_i$$

$$b_i \le \left\lfloor \sqrt{\frac{1}{q_{ii}}\left(C - \sum_{l=i+1}^{K} q_{ll}\left(\xi_l + \sum_{j=l+1}^{K} q_{jl}\xi_j\right)^2\right)} + \rho_i + \sum_{j=i+1}^{K} q_{ji}\xi_j \right\rfloor$$

where $\lceil x \rceil$ is the smallest integer greater than the real number x and $\lfloor x \rfloor$ is the largest integer smaller than the real number x.

In practice K internal counters are used, namely one counter per dimension, each counter counting between a lower and an upper bound as indicated in (17), given that each counter is associated with a particular pair of bounds. In practice these bounds can be updated recursively. We put:

$$S_i = S_i(\xi_{i+1}, \ldots, \xi_K) = \rho_i + \sum_{j=i+1}^{K} q_{ji}\xi_j \quad (18)$$

$$T_{i-1} = T_{i-1}(\xi_i, \ldots, \xi_K) = C - \sum_{l=i}^{K} q_{ll}\left(\xi_l + \sum_{j=l+1}^{K} q_{jl}\xi_j\right)^2 = \quad (19)$$

$$T_i - q_{ii}(\xi_i + S_i - \rho_i)^2$$

$$T_{i-1} = T_i - q_{ii}(S_i - b_i)^2 \text{ with } T_K = C. \quad (20)$$

Using equations (18) to (20), the range of variation of each component $b_i$ is determined recursively, commencing with the component $b_K$:

$$L_i^- \le b_i \le L_i^+ \quad (21)$$

$$\text{with } L_i^- = \left\lceil -\sqrt{\frac{T_i}{q_{ii}}} + S_i \right\rceil \text{ and } L_i^+ = \left\lfloor \sqrt{\frac{T_i}{q_{ii}}} + S_i \right\rfloor \quad (22)$$

We have heretofore assumed that the signatures $s_k(t)$ of the users were real. More generally, if the user signatures $s_k(t)$ are complex values, $s_k(t)=s_k^R(t)+j.s_k^I(t)$. In such instance, it can be shown that a result similar to (3) is obtained, namely:

$$y_2(i)=d_2(i)M_2+n_2(i) \quad (23)$$

where the vector $d_2(i)=(d_1^R(i),d_1^I(i),\ldots,d_K^R(i),d_K^I(i))$ with $d_k(i)=d_k^R(i)+j.d_k^I(i)$ represents the real and imaginary values of the symbols for the different users, $y_2(i)=(y_1^R(i), y_1^I(i), \ldots, y_K^R(i), y_K^I(i))$ is an observation vector where $y_k(i)=y_k^R(i)+j.y_k^I(i)$ is the complex output at instant i of the filter matched to the user k, namely:

$$y_k(i) \triangleq \int_{-\infty}^{+\infty} s_k^*(t-iT)r_i dt \quad (24)$$

where .* denotes the conjugate operation and where $M_2=A_2R_2$ with $A_2=\text{diag}(a_1,a_1,\ldots,a_K,a_K)$ and $R_2$ is the matrix of size 2K×2K:

$$R_2 = \begin{bmatrix} R_{1,1}^R & R_{1,1}^I & \cdots & R_{1,K}^R & R_{1,K}^I \\ -R_{1,1}^I & R_{1,1}^R & \cdots & -R_{1,K}^I & R_{1,K}^R \\ \vdots & \vdots & & \vdots & \vdots \\ R_{K,1}^R & R_{K,1}^I & \cdots & R_{K,K}^R & R_{K,K}^I \\ -R_{K,1}^I & R_{K,1}^R & \cdots & -R_{K,K}^I & R_{K,K}^R \end{bmatrix} \quad (25)$$

where $R_{qk} = \int_0^T s_q(t)s_k^*(t)dt = R_{q,k}^R + j.R_{q,k}^I$ for $k, q = 1, \ldots, K$ The vector $y_2(i)$ in equation (23) can be seen as a point of a lattice $\Lambda_2$ of dimension 2K, with a generator matrix $M_2$ corrupted by a real noise $n_2$. The components of the noise vector $n_2(i)$ being correlated an operation of noise whitening is performed on the signal $y_2(i)$ prior to decoding. The whitened observation vector is denoted $\tilde{y}_2(i)$ where $\tilde{y}_2(i)=y_2(i)(W_2^T)^{-1}$ and $R_2=W_2W_2^T$.

Here again, the maximum likelihood detection amounts to finding out the vector x belonging to a lattice $\Omega_2$ (of size 2K) which is closest to the received vector $\tilde{y}_2$. A sphere decoding method can be performed in accordance with the formalism set out in equations (12) to (22), namely by searching within an ellipsoid, the points belonging to the constellation.

The sphere decoding method has also been successfully applied to MC-CDMA as described in the article of L. Brunel entitled "Optimum multi-user detection for MC-CDMA systems using sphere decoding" published in the Proceedings PIRMC'01, September 2001, which is herein incorporated by reference. The main features of the sphere decoding method applied to MC-CDMA are set out below.

It is recalled that the MC-CDMA technique combines Orthogonal Frequency Division Multiplex (OFDM) modulation and CDMA. More precisely, at the transmitting side, in contrast to DS-CDMA where the signal for each user is multiplied in the time domain in order to spread its frequency spectrum, the signature here multiplies the signal of a user in the frequency domain, each element of the signature multiplying the signal of a different sub-carrier. The MC-CDMA technique can therefore be viewed as a spreading in the frequency domain followed by an OFDM modulation.

At the reception side, the received signal is decomposed (by a Fast Fourier Transform) into a set of frequency components relative to the L different sub-carriers of the OFDM multiplex.

Let us first consider a MC-CDMA receiver located in a mobile terminal, the base station transmitting symbols to a plurality K of users. Denoting $r(i)=(r_1(i), \ldots, r_L(i))$ the vector of the frequency components on the L sub-carriers, $d(i)=(d_1(i), \ldots, d_K(i))$ the vector of the K symbols transmitted at time i by the different users and C the matrix of the K spreading sequences, that is:

$$C = \begin{bmatrix} c_{11} & \cdots & c_{1L} \\ \vdots & & \vdots \\ c_{K1} & \cdots & c_{KL} \end{bmatrix} \quad (26)$$

The vector of the frequency components can be expressed as:

$$r(i)=d(i)AC(i)H(i)+\eta(i) \quad (27)$$

where $\eta(i)=(\eta_1(i), \ldots, \eta_L(i))$ is a white additive Gaussian noise vector, $A=\text{diag}(a_1, \ldots, a_K)$ is the diagonal matrix formed by the amplitudes coefficients of the different users, $H(i)=\text{diag}(h_1(i), \ldots, h_L(i))$ is the diagonal matrix formed by the downlink channel coefficients $h_l(i)$, relative to the transmission channel between the base station and the user. The expression (27) can be reformulated as follows:

$$r(i)=d(i)AC_D(i)+\eta(i) \quad (28)$$

where $C_D(i)=C(i)H(i)$.

If the case is taken of the uplink, a plurality of transmission channels is to be taken into account since the signal coming from each user passes through a different channel. The spreading and the channel effect can be combined in a matrix $C_U(i)$:

$$C_U(i) = \begin{bmatrix} c_{11}h_{11}(i) & \cdots & c_{1L}h_{1L}(i) \\ \vdots & & \vdots \\ c_{K1}h_{K1}(i) & \cdots & c_{KL}h_{KL}(i) \end{bmatrix} \quad (29)$$

If all the users are received synchronously, the received signal can then be written similar to (28):

$$r(i)=d(i)AC_U(i)+\eta(i) \quad (30)$$

We may define an observation vector $y(i)$ in the downlink case by:

$$y(i) \triangleq r(i) C_D^H(i) \quad (31)$$

and, similarly, in the uplink case:

$$y(i) \triangleq r(i) C_U^H(i) \quad (32)$$

where $\cdot^H$ stands for the transpose conjugate operation.

In both cases, the observation vector $y(i)$ can be viewed as the result of a filtering of the received signal $r(i)$ with a filter matched to the signature and channel relating to each user $k$. It can also be considered as a point of a lattice $\Lambda\Lambda$ with generator matrix $AC_D C_D^H$ in the downlink case and $AC^U C_U^H$ in the uplink case. In order to decorrelate the noise components of $y(i)$, a noise whitening can be applied. Denoting $\tilde{y}(i)$ the whitened version of the observation vector, the maximum likelihood detection of the transmitted symbols again amounts to finding out the vector $x$ of the lattice which is the closest to $\tilde{y}(i)$.

We have seen in the foregoing that the sphere decoding method can be used for maximum likelihood detection in DS-CDMA and MC-CDMA (for the downlink as well as for the uplink). In all the cases recited above, the ML detection comprises a first step in which the received signal is filtered with a filter matched to each of the spreading sequence and to the channel of the users for providing an observation vector $y$, and, further a noise whitened observation vector $\tilde{y}(i)$, followed by a sphere decoding step in which the vector $x$ of the lattice $(\Omega, \Omega_2)$ closest to the vector $\tilde{y}(i)$ is sought.

FIG. 2 illustrates schematically a DS-CDMA or a MC-CDMA receiver using a sphere decoding method.

The received signal $r(i)$ is filtered with a filter 210 matched to the signatures and channels of the K users to output an observation vector $y(i)$. The noise whitening in 220 provides a whitened version $\tilde{y}(i)$ of the observation vector and the lattice point closest to $\tilde{y}(i)$ is searched in the sphere decoder 230. The closest neighbour $x$ is output from the sphere decoder and the symbols transmitted to or by the different users are estimated therefrom.

As described above, in relation with expressions (17) to (22), the sphere decoding process necessitates to go through every lattice point included in the ellipsoid (16) and to compute for each of them the norm $\|w\|$. This scanning algorithm is very time consuming, in particular when the number of users K is high.

In order to speed up the sphere decoding process, some measures have already been proposed.

First, the search can be accelerated by updating the radius $\sqrt{C}$ with the lowest computed norm $\|w\|$ whereby the ellipsoid is scaled down each time a lower norm is found. Each rescaling implies however the computation of new bounds $L_i^-$ and $L_i^+$ and is followed by a new search within the updated bounds.

It has also been proposed in the article of L. Brunel entitled "Optimum and sub-optimum multi-user detection based on sphere decoding for multi-carrier code division access systems" published in the Proceedings of ICC'02, April 2002, incorporated herein by reference, to restrict the ranges of variation defined by (21) and (22) so as not to unnecessarily test points which are situated outside the constellation.

The aim of the present invention is to propose a further measure to reduce the complexity of the sphere decoding process.

The characteristics of the invention mentioned above, as well as others, will emerge more clearly from a reading of the following description given in relation to the accompanying figures, amongst which:

Figure 4:
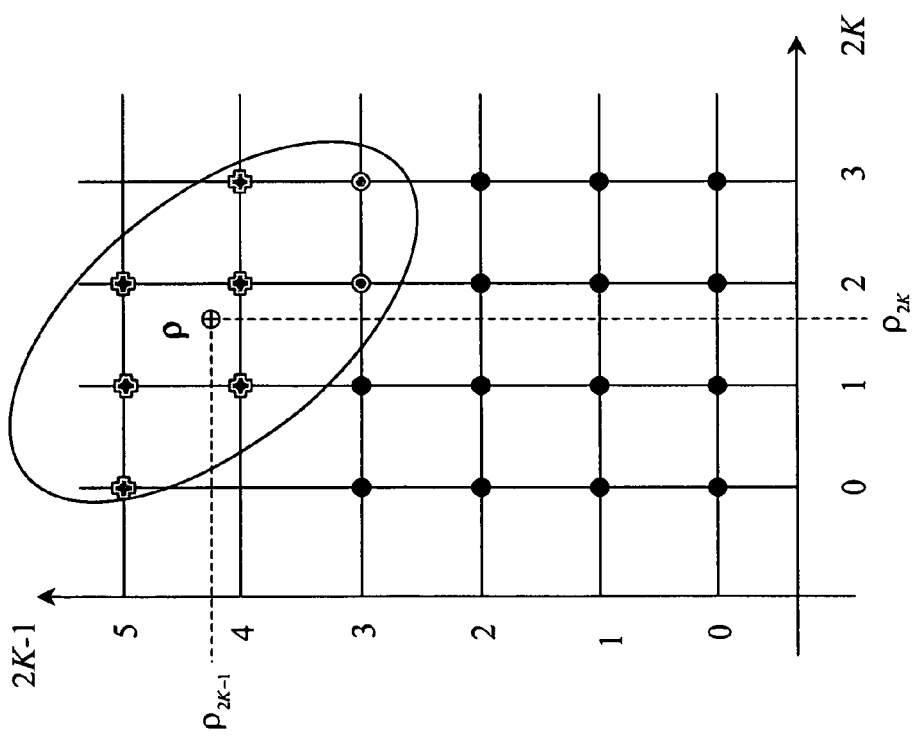
FIG. 4 illustrates the projection of the constellation and the received point onto the hyperplane defined by the first two dimensions used in sphere decoding.
Figure 4B:
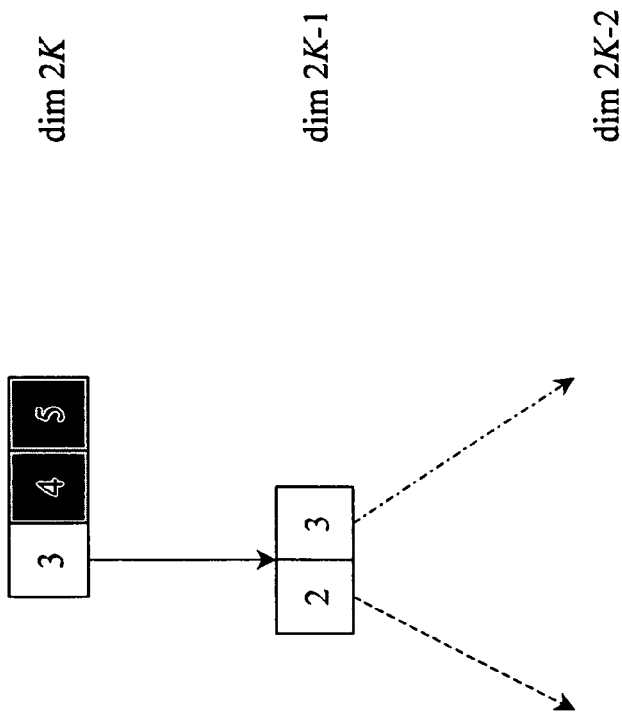
Figure 4A:
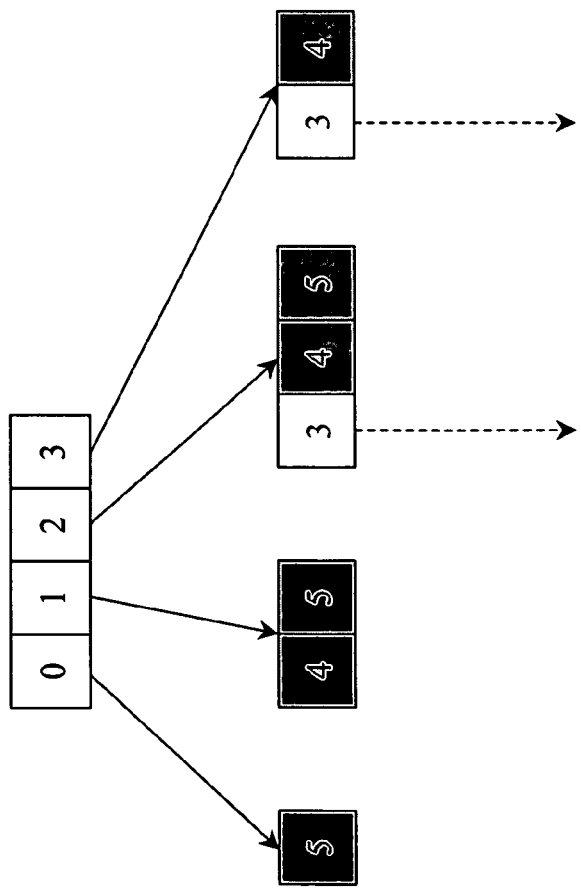

FIG. 4A gives the search tree of a sphere decoding method according to the prior art;

FIG. 4B gives the search tree of a sphere decoding method according to the invention.

We consider again a sphere decoding process as implemented e.g. in a receiver of a DS-CDMA or a MC-CDMA telecommunication system.

We assume in the following that the symbols $d_k(i)=d_k^R(i)+j \cdot d_k^I(i)$ transmitted to or by each user $k$ belong to a complex modulation alphabet $A_k$ of cardinality $|A_k|$.

Without loss of generality, it will be assumed in the sequel that the components $d_k^R(i)$ and $d_k^I(i)$ are PAM modulation symbols. In particular, the following results can be extended to the case where the symbols transmitted to or by the users are PSK modulation symbols, as shown in the article of Hochwald et al. entitled "Achieving near-capacity on a multiple antenna channel" available on the website mars.bell-labs.com.

Denoting $M_{2k-1}$ and $M_{2k}$ the modulation order for $d_k^R(i)$ and $d_k^I(i)$ respectively:

$$d_k^R(i) \in \{-M_{2k-1}+1, -M_{2k-1}+3, \ldots, M_{2k-1}-3, M_{2k-1}-1\} \text{ and} \quad (33)$$

$$d_k^I(i) \in \{-M_{2k}+1, -M_{2k}+3, \ldots, M_{2k}-3, M_{2k}-1\} \quad (34)$$

For example, this will be the case if the $d_k(i)$ are 16-QAM symbols (in such instance $M_{2k-1}=M_{2k}=4$).

If the following translation is effected:

$$d'^R_k(i) = \frac{1}{2}(d^R_k(i) + M_{2K} - 1) \text{ and} \quad (35)$$

$$d'^I_k(i) = \frac{1}{2}(d^I_k(i) + M_{2K} - 1) \text{ or again vectorially:}$$

$$d'_2(i) = \frac{1}{2}(d_2(i) + w_M)$$

where $w_M=(M_1-1, M_2-1, \ldots, M_{2K}-1)$. The components $d'^R_k(i)$ and $d'^I_k(i)$ are elements of Z and consequently $d'_2(i)$ is a vector of $Z^{2K}$.

In general terms, there exists an affine transform transforming the components $d^R_k(i)$ and $d^I_k(i)$ into elements of Z and the vector $d'_2(i)$ can be represented by a vector of $Z^{2K}$.

The set of the vectors $d'_2(i)$ will be hereinafter referred to as the constellation like the set of the vectors $d_2(i)$, the former being directly linked to the latter by the above mentioned transformation.

In a similar manner, the corresponding transformation is effected on $y_2(i)$ as defined in (23), that is to say:

$$y_2(i) = \frac{1}{2}(y_2(i) + w_M M_2) \quad (36)$$

By means of this affine transformation, which is assumed to be implicit hereinafter, the vector $d_2(i)M_2$ then belongs to a lattice of points $\Lambda_2$ of dimension $2 \cdot K$ as defined by equation (5) with $G=M_2$. Similarly, if a noise whitening is performed on $y_2(i)$, the vector $d_2(i)\tilde{M}_2$ belongs to a lattice of points $\Omega_2$ generated by the matrix $\tilde{G}=\tilde{M}_2=M_2(W_2^T)^{-1}$.

Figure 1:
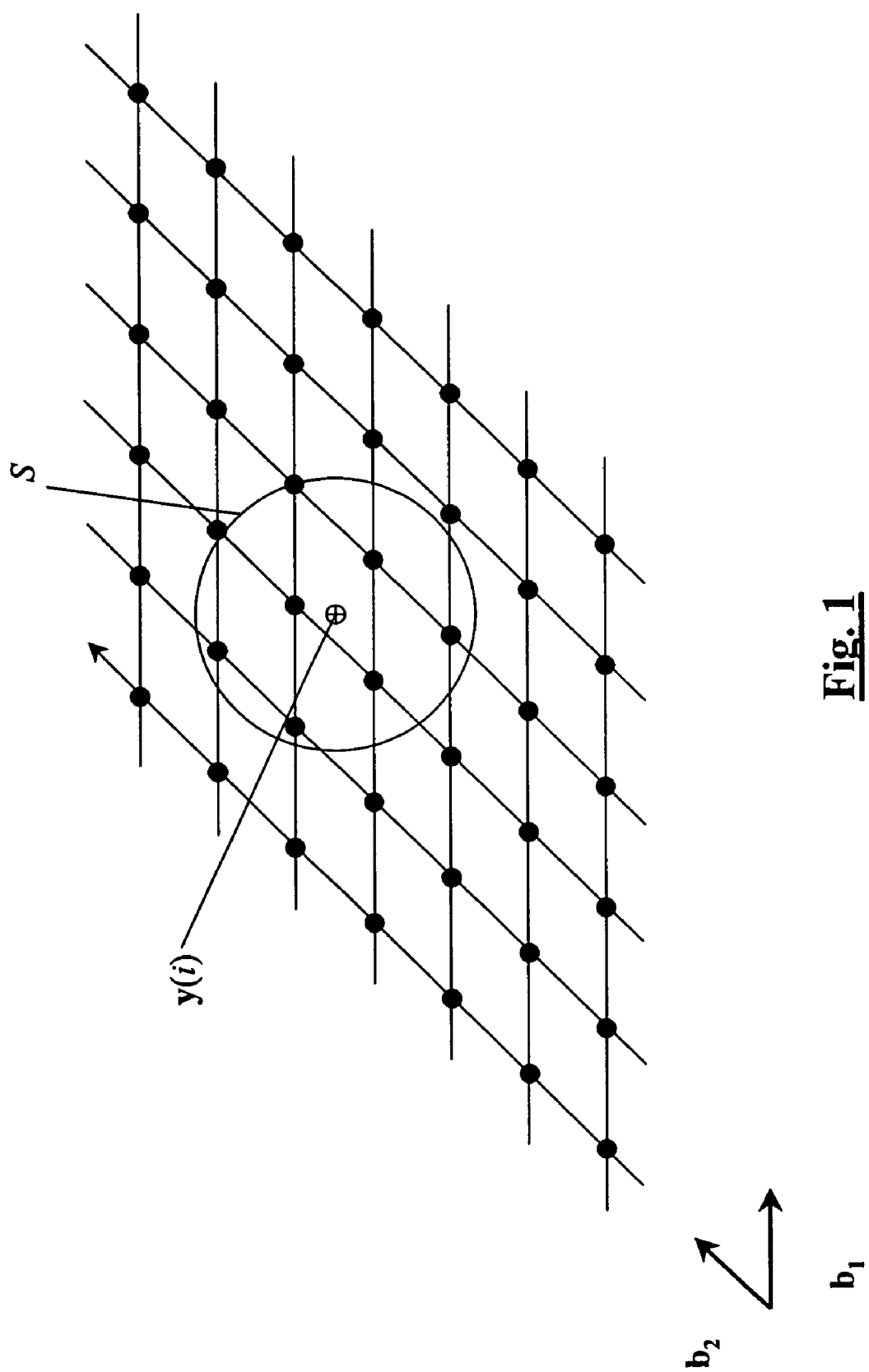
FIG. 1 depicts a lattice of points useful to the detection method employed in the receiver illustrated in FIG. 2.
Figure 2:
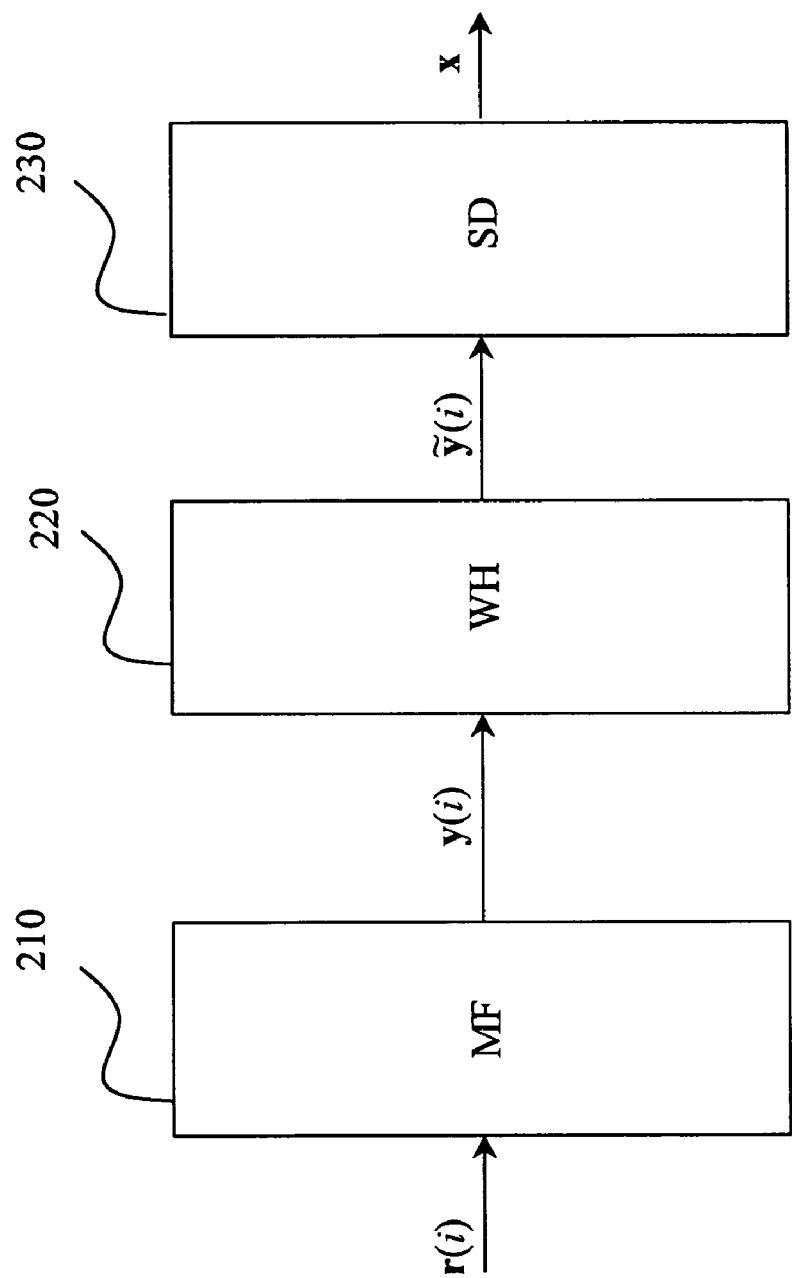
FIG. 2 depicts schematically the structure of a multi-user receiver using a sphere decoding method.
Figure 3:
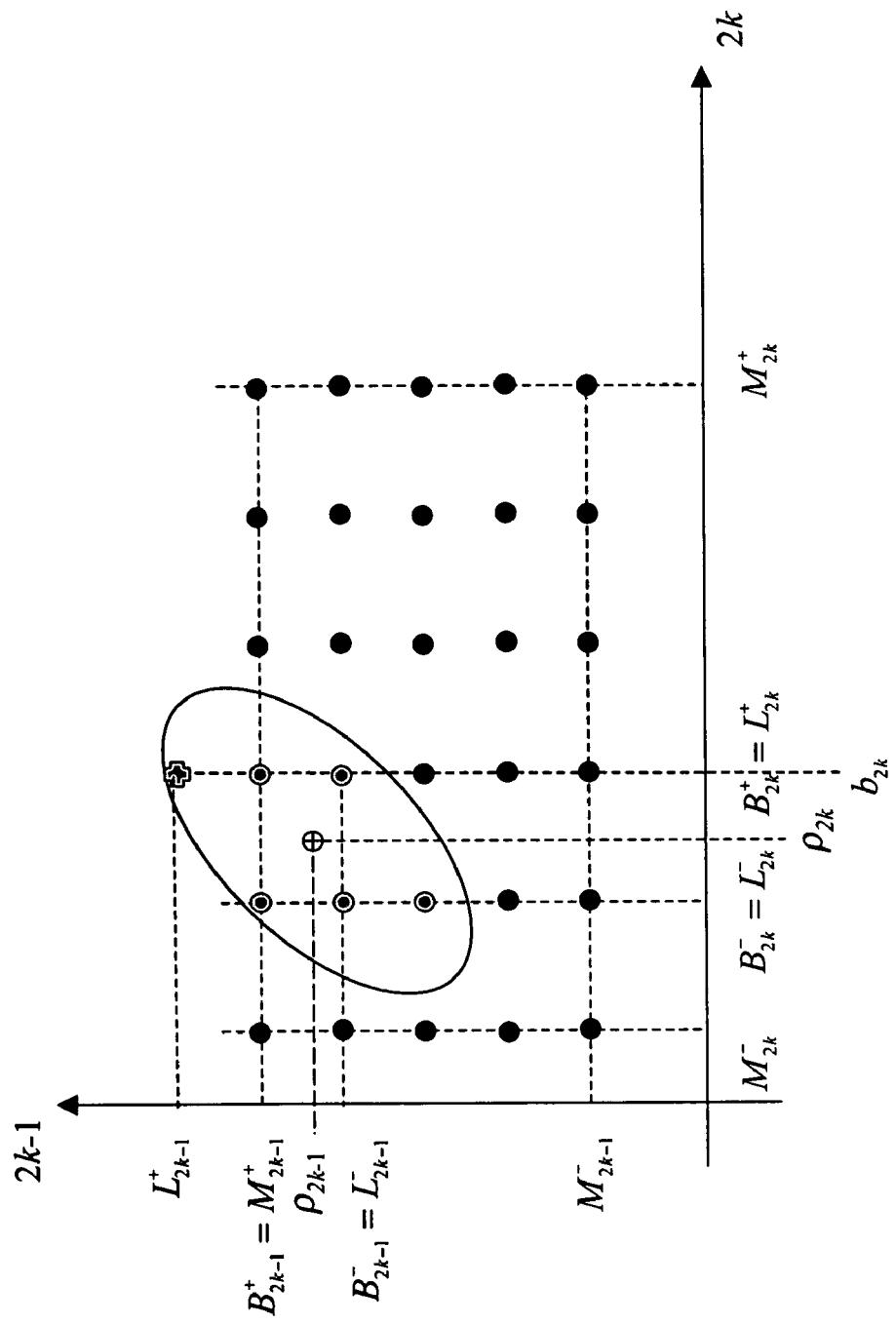
FIG. 3 depicts schematically an example of sphere decoding taking the constellation into account.

For each user k, the dimensions $2k-1$ and $2k$ bear respectively the real part and the imaginary part of the complex symbol transmitted by or to the user k considered. As indicated in FIG. 3, the constellation, or equivalently the modulation constellation of the user k, is projected onto the dimension $2k$. This projection defines an interval $[M_{2k}^-, M_{2k}^+]$. The bounds $L_{2k}^-$ and $L_{2k}^+$ having been determined in accordance with (18) to (22), the search interval $[B_{2k}^-, B_{2k}^+]$ can then defined by:

$$B_{2k}^- = \max(L_{2k}^-, M_{2k}^-) \text{ and } B_{2k}^+ = \min(L_{2k}^+, M_{2k}^+) \quad (37)$$

Once a value $b_{2k}$ has been chosen in the search interval $[B_{2k}^-, B_{2k}^+]$, the bounds $L_{2k-1}^-$ and $L_{2k-1}^+$ are determined and a new search interval $[B_{2k-1}^-, B_{2k-1}^+]$ on the dimension $2k-1$ is defined by:

$$B_{2k-1}^- = \max(L_{2k-1}^-, M_{2k-1}^-) \text{ and } B_{2k-1}^+ = \min(L_{2k-1}^+, M_{2k-1}^+) \quad (38)$$

where $[M_{2k-1}^-, M_{2k-1}^+]$ is the projection of the constellation onto the dimension $2k-1$.

In FIG. 3, the points of the lattice located within the ellipsoid are represented by grey circles if they belong to the constellation whereas they are represented by grey crosses if they are located outside the constellation.

The algorithm proceeds sequentially from a dimension to the preceding one. By varying for a given dimension κ each component $b_κ$ inside the interval $[B_κ^-, B_κ^+]$ instead of $[L_κ^-, L_κ^+]$, it is ensured that the closest neighbour is sought only amongst candidates which are both located in the ellipsoid and belonging to the constellation.

The idea at the basis of the invention in that the order according to which the dimensions of the lattice are treated strongly influence the complexity of the search. As it appears from (17), the search starts with the dimension of highest order (2K, in the present case) corresponding to the last row of the generator matrix G and proceeds sequentially with dimensions of lower order.

Let us consider the first two dimensions searched, 2K and 2K−1, for a given constellation, as illustrated in FIG. 4.

The points belonging to the constellation are represented by circles, coloured in grey if they are located in the ellipsoid and coloured in black otherwise. Grey crosses indicate the lattice points located in the ellipsoid but not belonging to the constellation. The projection of the received point ρ onto the hyperplane defined by the dimensions 2K and 2K−1 is characterised by its real coordinates $ρ_{2K}$ and $ρ_{2K-1}$.

The symbols transmitted to or by user K are supposed 16-QAM. The projection of the constellation onto the dimension 2K or 2K−1 corresponds therefore to the interval [0,3].

A search tree using conventional sphere decoding has been represented in FIG. 4A where each level of the tree corresponds to a dimension of the lattice, the lowest level being associated with the dimension of highest order (2K). Although the first two levels (corresponding to the dimensions 2K and 2K−1 of FIG. 4) are represented, it should be understood that the search tree comprises 2K levels. The horizontal extension of each node of the tree indicates the interval $[L_i^-, L_i^+]$, the sub-interval $[B_i^-, B_i^+]$ of which is represented by white boxes while the rest is represented by grey boxes.

The search starts with the determination of $[B_{2K}^-, B_{2K}^+]$. From FIG. 4, it appears that $[L_{2K}^-, L_{2K}^+]=[0,3]$ and $[M_{2K}^-, M_{2K}^+]=[0,3]$, hence $[B_{2K}^-, B_{2K}^+]=[0,3]$ which means that $b_{2K}$ can take four possible values:

If $b_{2K}=0$, $[B_{2K-1}^-, B_{2K-1}^+]=[L_{2K-1}^-, L_{2K-1}^+] \cap [M_{2K-1}^-, M_{2K-1}^+]=\{5\} \cap [0,3]=\emptyset$, hence no candidate value of $b_{2K-1}$ is to be considered and the node is therefore a dead leaf.

If $b_{2K}=1$, $[B_{2K-1}^-, B_{2K-1}^+]=[L_{2K-1}^-, L_{2K-1}^+] \cap [M_{2K-1}^-, M_{2K-1}^+]=[4,5] \cap [0,3]=\emptyset$, hence this node is also a dead leaf.

If $b_{2K}=2$, $[B_{2K-1}^-, B_{2K-1}^+]=[L_{2K-1}^-, L_{2K-1}^+] \cap [M_{2K-1}^-, M_{2K-1}^+]=[3,5] \cap [0,3]=\{3\}$, hence $b_{2K-1}=3$ is the single candidate value to be considered. Only one branch starts from this node to the subsequent level 2K−2.

If $b_{2K}=3$, $[B_{2K-1}^-, B_{2K-1}^+]=[L_{2K-1}^-, L_{2K-1}^+] \cap [M_{2K-1}^-, M_{2K-1}^+]=[3,4] \cap [0,3]=\{3\}$, hence $b_{2K-1}=3$ is again the single candidate value to be considered. Only one branch starts from this node to the level 2K−2.

We define the passing rate $σ_i$ of a node by the ratio:

$$\sigma_i = \frac{|B_i^+ - B_i^-|}{|L_i^+ - L_i^-|} \quad (39)$$

The passing rate of a node is a measure of the filtering effect induced by the restriction of the search to the interval $[B_i^-, B_i^+]$. If the passing rate is low, the filtering effect is high and, conversely, if the passing rate is high, the filtering effect is low.

The passing rate of a dimension k or, equivalently of a level of the tree, is defined as the average passing rate of the nodes belonging to that level.

As it can be seen from FIG. 4A, the search tree is poorly selective at its root (4 candidates retained for $b_{2K}$ out of four) while the nodes at a higher level are significantly more selective (at most 1 candidate retained out of three for $b_{2K-1}$). It should be noted that the passing rate of a node can be obtained as the ratio of white boxes to the total number of boxes of said node.

Such a tree is ill-conditioned for the search because a lot of branches finally ending to dead leaves (i.e. associated with a void interval $[B_\kappa^-, B_\kappa^+]$) are explored in vain, the calculation of the bounds made at the intermediate nodes along the branch proving useless in the end.

According to the present invention, it is proposed to reorder the vectors of the lattice, i.e. the rows of the generator matrix, so that the root and low level nodes of the search tree correspond to low passing rates (i.e. high selectivity). This enables to discard at an early stage large parts of the ellipsoid which do not intersect the constellation.

According to a first embodiment, the rows of the generator matrix or the dimensions are ordered according to values representing the distance of the projected centre of the ellipsoid, normalized to the size of the projected constellation. More specifically for each row or dimension $\kappa$, it is calculated:

$$\varepsilon_\kappa = \frac{2 \cdot \delta_\kappa}{|M_\kappa^+ - M_\kappa^-|} \qquad (40)$$

where $$\delta_\kappa = \left|\rho_\kappa - \frac{1}{2}(M_\kappa^- + M_\kappa^+)\right|$$

denotes the distance of the centre of the ellipsoid, projected onto dimension $\kappa$, to the middle of the projected constellation.

In practice, it should be understood that any expression reflecting the said normalized distance can be used instead of expression (40).

The value $\varepsilon_\kappa$ represents the eccentricity of the projection of the constellation centre relatively to the projected constellation. The higher the eccentricity, the more likely the interval $[L_\kappa^-, L_\kappa^+]$ and $[M_\kappa^-, M_\kappa^+]$ will little overlap and the interval $[B_\kappa^-, B_\kappa^+]$ will be smaller than $[L_\kappa^-, L_\kappa^+]$.

According to a first reordering rule, the rows are ordered by increasing values of $\varepsilon_\kappa$, namely the larger the normalized distance (or, equivalently the higher the eccentricity), the higher the order of the row. By so doing, the low levels in the search tree correspond to dimensions for which the projection of the ellipsoid centre lies far outside the projection of the constellation. The dimensions exhibiting low passing rates are therefore concentrated at the low levels of the tree, thus enabling to early discard lattice points. By applying the first reordering rule, the search of the candidate points belonging to the intersection of the ellipsoid with the constellation is significantly accelerated.

According to a second embodiment, directed to the case where the constellation has the same size along each and every dimension, the following ordering rules are used:

According to a second ordering rule, the last rows of the generator matrix are chosen so that they correspond to the dimensions $\kappa$ where $\rho_\kappa < M_\kappa^-$ or $\rho_\kappa > M_\kappa^+$. Denoting $\delta'_\kappa$ the distance between $\rho_\kappa$ and $M_\kappa^-$ (if $\rho_\kappa < M_\kappa^-$) or between $\rho_\kappa$ and $M_\kappa^+$ (if $\rho_\kappa > M_\kappa^+$), these rows are ordered by increasing values of $\delta'_\kappa$, namely the higher the distance, the higher the order of the row. The search begins with dimensions exhibiting comparatively high distance values. The low levels of the search tree correspond therefore to dimensions for which the projection of the ellipsoid centre lies far outside the projection of the constellation. Consequently, the dimensions exhibiting low passing rates are concentrated at the low levels of the tree.

According to a third ordering rule, the first rows of the generator matrix are chosen so that they correspond to the dimensions $\kappa$ where $M_\kappa^- \leq \rho_K \leq M_\kappa^+$.

These rows are ordered by increasing values of $\delta_\kappa$ as defined above, namely the higher the distance the higher the order of the row. The search begins with dimensions exhibiting comparatively high distance values. For a given interval $[L_\kappa^-, L_\kappa^+]$, the lower $\delta_\kappa$ the more likely the interval $[B_\kappa^-, B_\kappa^+]$ will have the same size as $[L_\kappa^-, L_\kappa^+]$. The dimensions exhibiting high passing rates (i.e. low selectivity) are therefore concentrated in the high levels of the tree.

The second and third ordering rules can be jointly used for sorting the dimensions, the last rows being those for which $\rho_\kappa < M_\kappa^-$ or $\rho_\kappa > M_\kappa^+$ and the first rows those for which $M_\kappa^- \leq \rho_K \leq M_\kappa^+$.

By applying the second and/or the third reordering rules, the search of the candidate points belonging to the intersection of the ellipsoid with the constellation is significantly accelerated. This point is illustrated in FIG. 4B showing a search tree according to the sphere decoding method of the invention. The application of the first or the second ordering rule leads here to the exchange of dimension 2K with dimension 2K−1, that is to an exchange of the last two rows of the generator matrix G.

After exchange, the search starts with the determination of the new interval $[B_{2K}^-, B_{2K}^+]$. As can be seen from FIG. 4, $[L_{2K}^-, L_{2K}^+] = [3,5]$ and $[M_{2K}^-, M_{2K}^+] = [0,3]$, hence $[B_{2K}^-, B_{2K}^+] = \{3\}$. The component $b_{2K}$ can take only one value and therefore only one branch is to be explored.

For $b_{2K} = 3$, we have $[L_{2K-1}^-, L_{2K-1}^+] = [2,3]$ and, therefore:

$[B_{2K-1}^-, B_{2K-1}^+] = [L_{2K-1}^-, L_{2K-1}^+] \cap [M_{2K-1}^-, M_{2K-1}^+] = [2,3] \cap [0,3] = [2,3]$. The two candidate points are found after having explored two nodes only (in comparison with 5 nodes in FIG. 4A).

According to a third embodiment, for each dimension, there is calculated the passing rate exhibited by the root if the search were to start with said dimension (i.e. when the row corresponding to this dimension were the last of the generator matrix). This passing rate is denoted $\sigma_{2K}^i$ and can be expressed as:

$$\sigma_{2K}^i = \frac{|B_{2K}^+ - B_{2K}^-|}{2 \cdot \sqrt{C/q_{2K,2K}}} = \frac{\left|\min\left(\left[\sqrt{\frac{C}{q_{2K,2K}}} + \rho_{2K}\right], M_{2K}^+\right) - \max\left(\left[-\sqrt{\frac{C}{q_{2K,2K}}} + \rho_{2K}\right], M_{2K}^-\right)\right|}{2 \cdot \sqrt{C/q_{2K,2K}}} \qquad (40)$$

The term $q_{2K,2K}$ appearing at the right side of expression (40) is the coefficient appearing at the bottom right corner of the matrix $\Delta$. It depends on i because the matrix $\Delta$ is obtained here by Cholesky factorization of the generator matrix G after it has been subjected to a row permutation to place the ith row at the bottom of the matrix.

According to a fourth ordering rule, the rows of the generator matrix are ordered by decreasing values of $\sigma_{2K}^i$, namely the row are permuted so that the lower the passing rate, the higher the order of the row. Hence, the search starts with the dimensions exhibiting comparatively low passing rates.

The third embodiment requiring 2K Cholesky factorizations, it is advantageous when the number of users is rather low.

Whatever the ordering rule is used, each reordering of the dimensions can be expressed as a permutation $\pi$ of the rows of the generator matrix. Once the closest point b of the constellation to the received point $\rho$ has been found, the inverse permutation $\pi^{-1}$ is performed on the components of b and the symbols $d_k(i)$ of the K users are derived therefrom.

The invention claimed is:

1. A method for detecting a plurality of symbols transmitted by or for a plurality K of users, each symbol belonging to a modulation constellation, comprising:

filtering a received signal for supplying an observation vector (z) each component of which being related to a user;

searching the closest neighbor of said observation vector among candidate vectors belonging to a subset, determined by said modulation constellations, of a lattice of points generated by a plurality of generating vectors, the search being limited to a volume centered around said observation vector and being carried out by sequentially selecting a coordinate of a candidate vector for each dimension of said lattice of points;

expressing the components of said observation vector in a reordered lattice of points obtained by reordering said generating vectors according to an ordering rule prior to said search, the ordering rule being chosen so as to eliminate a higher rate of candidate vectors for a first dimension of the reordered lattice of points than for a subsequent dimension of the reordered lattice of points to be searched; and detecting the plurality of symbols transmitted by or for the plurality of K users by selecting a candidate vector closest to the observation vector, the selecting including expressing reordered dimensions as a permutation $\pi$ of the rows of the generating vectors, once the closest point b of a constellation to a lattice point $\rho$ has been found, an inverse permutation $\pi^{-1}$ is performed on components of b to derive the plurality of symbols transmitted by or for the plurality of K users.

2. The method according to claim 1, wherein, for each dimension of the reordered lattice of points, a first interval is determined representing the constellation along said dimension and that, for a plurality of coordinates already selected if any, a second interval is determined representing a portion of said volume along said dimension, the selection of a coordinate for said dimension being then limited to a third interval obtained as the intersection of said first and second intervals.

3. The method according to claim 2, wherein, for each dimension of the reordered lattice of points, it is calculated a value representative of a distance between projection of the center of said volume onto said dimension and the middle of said first interval, normalized by the size of the middle of said first interval, the ordering rule being such that a first dimension to be searched is associated with a higher normalized distance value than a value associated with a subsequent dimension to be searched.

4. The method according to claim 2, wherein, for each dimension of the reordered lattice of points, it is checked whether the projection of the center of said volume onto said dimension falls withing said first interval and, if not, the larger value of the distance between said projection and respectively the upper and lower bounds of said first interval is determined, the ordering rule being such that a first dimension to be searched is associated with a higher value than a value associated with a subsequent dimension to be searched.

5. The method according to claim 2, wherein, for each dimension of the reordered lattice points, it is checked whether the projection of the center of said volume onto said dimension falls within said first interval and, if so, the value of the distance between said projection and the middle of said interval is determined, the ordering rule being such that a first dimension to be searched is associated with a higher value than a value associated with a subsequent dimension to be searched.

6. The method according to claims 4 or 5, wherein the projection of the center of said volume onto a first dimension falling outside a said first interval representing the constellation along the first dimension and a the projection of the center of said volume onto a second dimension falling within another first interval representing the constellation along the second dimension, the ordering rule being such that the first dimension is searched before said second dimension.

7. The method according to claim 2, wherein, for each dimension of the reordered lattice of points a fourth interval is determined representing the projection of said volume onto said dimension, a fifth interval is obtained as the intersection of said first and fourth intervals and a value representative of the ratio of the length of the fifth interval to the length of the fourth interval is calculated, the ordering rule being such that a first dimension to be searched is associated with a lower value than a value associated with a subsequent dimension to be searched.

8. The method according to any one of claims 1-5 or 7, wherein, once the closest neighbor has been found, its coordinates are reordered according to the inverse of said ordering rule and the symbols transmitted to or by said plurality of users are derived from said reordered coordinates.

* * * * *